(12) United States Patent
Kucera (10) Patent No.: US 11,100,421 B2
(45) Date of Patent: Aug. 24, 2021

(54) CUSTOMIZED WEBSITE PREDICTIONS FOR MACHINE-LEARNING SYSTEMS

(71) Applicant: Adobe Inc., San Jose, CA (US)

(72) Inventor: John T. Kucera, San Jose, CA (US)

(73) Assignee: ADOBE INC., San Jose, CA (US)

( * ) Notice: Subject to any disclaimer, the term of this patent is extended or adjusted under 35 U.S.C. 154(b) by 791 days.

(21) Appl. No.: 15/332,370

(22) Filed: Oct. 24, 2016

(65) Prior Publication Data

US 2018/0114139 A1 Apr. 26, 2018

(51) Int. Cl.
| | |
|---|---|
| *G06N 20/00* | (2019.01) |
| *H04L 29/08* | (2006.01) |
| *G06F 16/95* | (2019.01) |
| *G06Q 30/02* | (2012.01) |

(52) U.S. Cl.
CPC ............ *G06N 20/00* (2019.01); *G06F 16/95* (2019.01); *G06Q 30/0243* (2013.01); *G06Q 30/0254* (2013.01); *G06Q 30/0269* (2013.01); *H04L 67/22* (2013.01); *H04L 67/02* (2013.01)

(58) Field of Classification Search
CPC .... G06F 16/9535; G06N 20/00; G06N 7/005; G06N 99/005; H04L 67/02; H04L 67/10; H04L 67/22
See application file for complete search history.

(56) References Cited

U.S. PATENT DOCUMENTS

| | | | |
|---|---|---|---|
| 8,417,654 B1 * | 4/2013 | Cao ...................... | G06Q 30/02 463/20 |
| 10,157,347 B1 * | 12/2018 | Kasturi .............. | G06F 16/3322 |
| 2015/0088788 A1 * | 3/2015 | Traupman .............. | G06N 5/048 706/11 |
| 2016/0055277 A1 * | 2/2016 | Lahav .................... | G06Q 30/02 703/22 |
| 2016/0180372 A1 * | 6/2016 | Lu ....................... | G06Q 30/0242 705/14.41 |

(Continued)

OTHER PUBLICATIONS

Brieman, Leo, "Random Forests-Random Features", Technical Report 567, Statistics Dept., U.C. Berkeley, Sep. 1999, 29 pages.

(Continued)

*Primary Examiner* — Li B. Zhen
*Assistant Examiner* — Selene A. Haedi
(74) *Attorney, Agent, or Firm* — Kilpatrick Townsend & Stockton LLP (57) ABSTRACT

In one aspect, a request for web content is received from a user device communicatively coupled to the processing device via the network. In response to receiving the request, user information associated with the user is determined. Predicted responses of the user to each variation of a plurality of variations of the web content are determined using prediction models and the user information. The prediction models include one or more decision trees generated using a splitting criterion requiring a minimum number of positive responses to a variation and a minimum number of negative responses to the variation as a condition of considering the possible split. The variation determined to have a threshold likelihood of yielding a predicted positive response of the predicted responses is selected based on the user information. The variation is transmitted to the user device via the network.

20 Claims, 8 Drawing Sheets

(56) References Cited

U.S. PATENT DOCUMENTS

2019/0147350 A1* 5/2019 Bai .................. G06N 5/003
　　　　　　　　　　　　　　　　　706/25

OTHER PUBLICATIONS

Badulescu, Laviniu Aurelian, "The Choice of the Best Attribute Selection Measure in Decision Tree Induction", Annals of Univ. of Craiova, Math. Comp. Sci. Ser., vol. 34, issue 1, 2007, 6 pages.
Mingers, John, "An Empirical Comparison of Pruning Methods for Decision Tree Induction", Machine Learning, 4, Kluwer Academic Publishers, 1989, 17 pages.
Apache Spark 2.4.3 "MLlib: RDD-based API", http://spark.apache.org/docs/latest/mllib-guide.html, 2019, accessed Aug. 14, 2019, 2 pages.

* cited by examiner

CUSTOMIZED WEBSITE PREDICTIONS FOR MACHINE-LEARNING SYSTEMS

TECHNICAL FIELD

This disclosure relates generally to computer-implemented methods and systems for predicting a user's response to website variations and more particularly relates to machine-learning systems for customizing web content based on prediction models and user information.

BACKGROUND

Machine-learning systems are popularly used to personalize content for content-related services. For instance, a user accesses a web page hosted on a content server. A machine-learning system, which may be on the content server, or another server, is trained to customize web content in response to input. For example, the customized content is selected by the system from many variations of a web page based on a prediction of the user's response to viewing the content. The machine-learning system may implement prediction models that rely on decision trees to predict the response. For example, machine-learning systems may implement Random Forest® learning methods that include hundred or, in some instances, thousands, of decision trees for each prediction model.

The decision on which variation of the web page to transmit to the user device must be done in real-time (e.g., 30 milliseconds) as the user is waiting for the web page to load. However, it can be difficult to execute this system quickly when large prediction models (e.g., prediction models having thousands of decision trees, each having a large number of branch nodes extending from a single root node) are used to determine the customized content to provide the user. In addition to the evaluation speed, the size of the prediction models may require significant storage space. To evaluate the prediction models quickly, all of the prediction models for each web page variation are stored in memory or an accessible storage device. Such computations become computationally infeasible (e.g., not enough processing power or storage space) with a large number of web page variations.

SUMMARY

One exemplary aspect of the present disclosure involves predictively customizing web content for a user using prediction models implementing decision trees that are generated based on a splitting criterion. For example, a user operates a user device to request content from a server. A content personalization system receives the request and customizes the content based on information about the user. The prediction models used to predict responses of the user to the different web content variations determine the predicted response (e.g., a purchase of a product or service). The decision trees making up the prediction model are generated using a splitting criterion that requires a minimum number of positive instances (e.g., a conversion, such as a purchase of a product) and a minimum number of negative instances (e.g., a non-conversion, or no product purchase) to be on each side of a split. The web content variation associated with the prediction model determined to have a likelihood of yielding a desired response higher than a determined threshold is selected and transmitted to the user via the network.

These illustrative features are mentioned not to limit or define the disclosure, but to provide examples to aid understanding thereof. Additional aspects are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Certain aspects involve machine-learning systems for choosing web content variations for a user based on prediction models with decision trees generated using improved splitting criteria that include a rule or other instruction requiring a minimum number of positive instances (e.g., conversions) and negative instances (e.g., non-conversions) on each side of one or more splits in the decision trees. Specifically, disclosed are methods, systems, and computer readable media that embody techniques for using such prediction models to predict a user response to a content variation. The prediction accounts for features and other information (e.g., internet protocol address, browsing history, browser type, age, and sex) associated with a user. Once selected, the content variation is provided to a computing device of the user. Hence, the disclosed techniques predictively customize the web content presented to the user. For instance, in a web environment where a user device requests a web page from a server, the disclosed techniques predictively personalize the content of the web page based on features associated with the user device (e.g., features of the user device itself or features of a user operating the user device).

To illustrate, consider an example of inserting an advertisement in a banner space of a web page. In this example, ten advertisements (or some other number) are available. Hence, there are ten web page variations, where each variation corresponds to a combination of the web page and one of the advertisements. Also in this example, twenty user features (or some other number) are available. Examples of such user features include age, occupation, location, internet protocol (IP) address, and other user-related features. Over a period of time, access of users to the web page is tracked. For each user, the tracking includes recording the respective user features, the presented web page variation, and the resulting user response (e.g., user conversion or no user conversion). This tracking results in historical data.

The historical data is used to train prediction models, each of which consists of one or more decision trees, that are used for predicting user conversions. During this process, the machine-learning system applies splitting criteria to grow the decision trees. The splitting criteria are used to limit the decision trees to grow branches only in response to encountering circumstances that satisfy the splitting criteria. In one example, the prediction models are trained to recognize certain user features and select different variations of the content based on the user features. For instance, upon a new user operating a computing device to access the web page, features specific to that user are determined. Likelihoods of conversions of the user are determined using the trained prediction models based on the user-specific features. Each likelihood corresponds to one of the web page variations. The web page variation having one of the highest likelihood is selected. That web page variation is provided to the computing device of the user for presentation. Accordingly, the web page is predictively customized by inserting the advertisement that most likely results in a user conversion.

Although the machine-learning systems described herein apply techniques for predicting and selecting variations of web content to illustrate aspects of the present disclosure, the machine-learning systems may apply such techniques in many different contexts that implement decision-tree prediction models. Non-limiting examples of contexts in which such prediction models may be implemented include weather prediction, fraud detection, and medical diagnoses.

As used herein, a "prediction model" represents a model for predicting a user response. Certain aspects of such a model are further described herein below. Generally, the prediction model includes a statistical model that attempts to predict the future behavior of a user in response to viewing one or more variations of a web page. An example prediction model includes multiple decision trees corresponding to multiple values of variables in a dataset. Each branch of the decision tree represents a decision that is evaluated against a user profile corresponding to the user or a user device to predict a statistical likelihood that a user will perform a desired action, such as purchase a product or service, in response to viewing a variation of web content. A prediction model may correspond to each variation of the web content to predict the statistical likelihood of the desired response if the corresponding web content variation were to be shown to the user.

As used herein, a "content personalization system" represents a computer-implemented component or process for personalizing web content. The personalization includes customizing the web content by selecting a variation of the web content based on user information. For instance, the content personalization system implements a prediction model to predictively customize the content. In an example, the content personalization system is hosted on a computing resource that interfaces with a network resource that hosts content. In another example, the content personalization system is hosted on the network resource. Customizing a content presentation involves customizing content or a presentation of the content.

In some aspects, a content personalization system that implements the techniques disclosed herein provides several advantages over existing systems. For example, the splitting criterion according to the present disclosure only allows a decision tree of the prediction model to grow when such criterion is met. Thus, the splitting criterion typically reduces the depth (e.g., levels) of the decision trees and the number of nodes in the decision trees. The reduction in depth reduces the overall size of the decision trees, which reduces the amount of available space required for storing prediction models for each variation of the web content. Additionally or alternatively, reducing the number of nodes in the decision trees reduces the processing time for the prediction model, because there are fewer decisions to be evaluated against the user information to make the prediction. The reduced processing time results in a faster response time to requests for access to content. The reduced processing time also allows the server to respond quickly to multiple users simultaneously without overburdening the processing power of the server. Further, requiring both positive and negative responses on each side of a decision split reduces the size and processing time of the prediction models while maintaining the accuracy of the prediction as described herein below.

Figure 1:
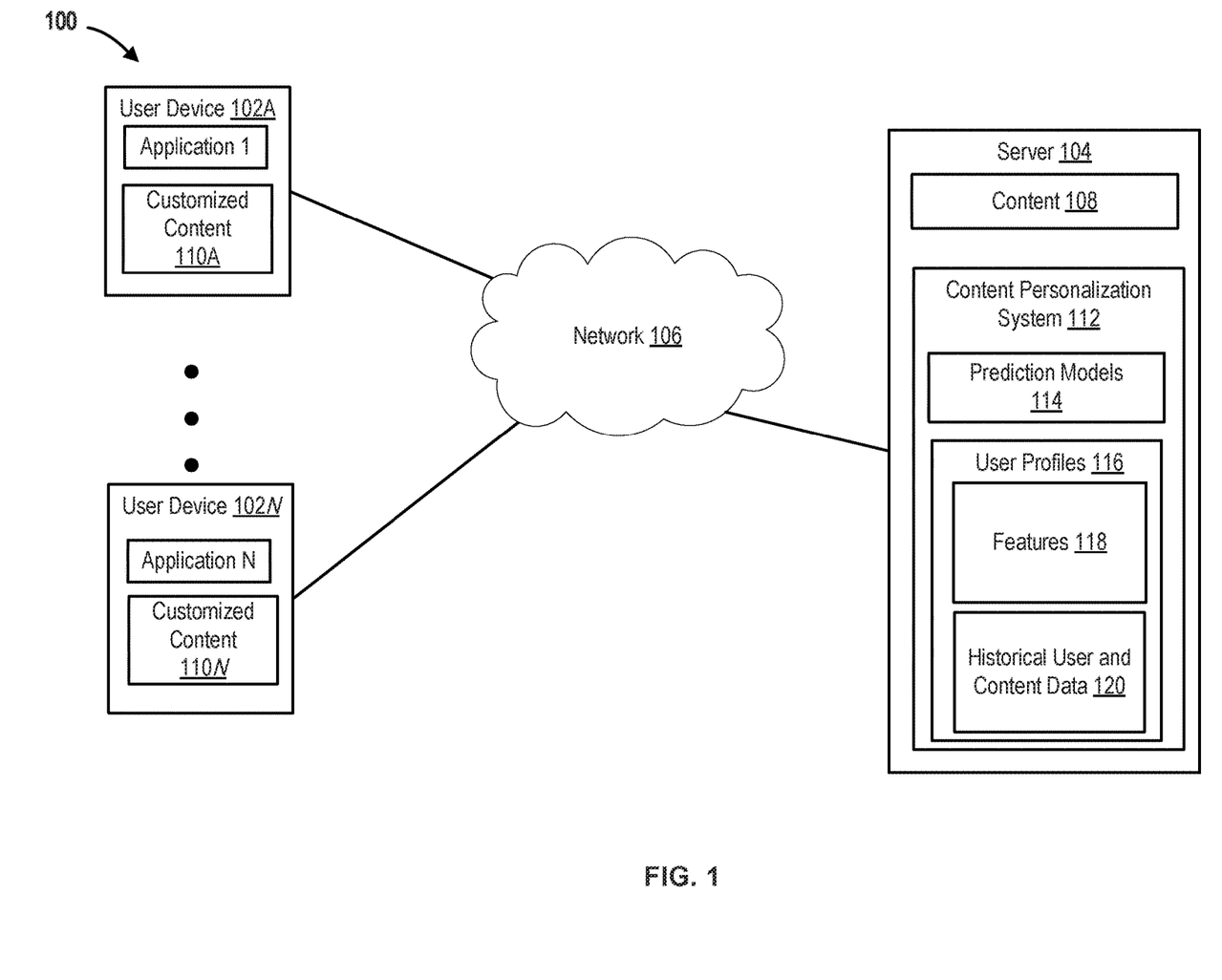
FIG. 1 is a block diagram depicting an example of a network environment for determining customized web content according to an aspect of the present disclosure.

Turning now to the drawings, FIG. 1 is an example of a networking environment 100 for determining customized web content according to an aspect of the present disclosure. Multiple user devices 102A-102N are communicatively connected to a server 104 via a network 106. The server 104 hosts content 108 that may be transmitted to the user devices 102A-102N via the network 106 and presented to the user on respective user interfaces of the user devices 102A-102N. In some aspects, the user devices 102A-102N access the server 104 individually (e.g., at different times). In other aspects, multiple user devices 102A-102N access the server 104 simultaneously to request the content 108. The server 104 includes one or more processing devices to process requests for content 108 from each of the user devices 102A-102N, predict a variation of the content 108 for each request, and transmit a variation of the content 108 to each user device 102A-102N (e.g., customized content 110A-110N) according to which variation of the content 108 is predicted to yield one of the highest likelihoods of conversion.

In some aspects, the user devices 102A-102N represent a suitable computing system that a user operates to access the content 108. Such a system or device can be physical or virtual. Examples of the user devices 102A-102N include, but are not limited to, a personal computer (PC), tablet computer, a desktop computer, a mobile phone, a processing unit, any combination of these devices, or any other suitable device having one or more processors. Each user device includes at least one application supported by the server 104. The server 104 represents a suitable computing system or computing device that hosts the content 108. Such a system or device can also be physical or virtual. For example, the server 104 includes a content resource that hosts a web page, a content data network, a server farm, or other content-hosting systems. The network 106 represents a data communication network that can be in part or in full a public network, such as the Internet, or a private network, such as an Intranet.

A content personalization system 112 is configured to detect and track the interaction between the user devices 102A-102N and the server 104. The content personalization system 112 enables the user to provide different digital experiences to the users when different users request the same webpage content 108. The content personalization system 112 is configured to predict, using prediction models 114 associated with different variations of the content 108 and user profiles 116 associated with each of the user devices 102A-102N, a response to a presentation of each variation of the content 108. If the predicted response is satisfactory, the content personalization system 112 selects the variation of the content 108 and provides the variation to the user device 102A-102N as customized content 110A-110N. In some aspects, the customized content 110A-110N includes the same variation of the content 108 for two or more of the user devices 102A-102B. For example, the content personalization system 112 may predict a satisfactory result by the user device 102A and a user device 102B (not shown) and transmit the same variation of the content 108 (e.g., customized content 110A) to both user device 102A and 102B. Although the content personalization system 112 is shown in FIG. 1 as integral to the server 104, in some aspects, the content personalization system 112 is separate from, but communicatively connected to the server 104 (e.g., via the network 106) without departing from the scope of the present disclosure.

In some aspects, the content personalization system 112 stores or has access to one prediction model 114 for each variation of the content 108. The prediction models 114 are constructed using Random Forest® algorithm or other suitable predictive means to generate decision trees. The decision trees correspond to subsets of data and features that are compared with the user profile 116 to predict a likelihood of a conversion by the user device 102A-102B.

The user profiles 116 include features 118 and historical user and content data 120. Features 118 represent features associated with the user device 102A-102N. In an example, a feature relates to a user of the user device 102A-102N. For instance, the feature includes an age, occupation, location or other user-related information. In another example, a feature relates to the user device 102A-102N itself. For instance, the feature includes an IP address of the user device 102A-102N, a network to which the user device 102A-102N belongs, an identifier of a service provider of the network 106, and other user-related information. In both examples, personally identifiable information is not used unless consent of the user is received. The historical user and content data 120 represents historical data associated with an interaction of a user device 102A-102N with the server 104. Such data includes, for example, historical features, requested content, previously provided content, historical user responses to such content, and other historical data related to user device-server interactions.

Generally, the networking environment 100 illustrated in FIG. 1 facilitates various applications that relate to customizing content. An example application relates to marketing campaigns. Another application relates to personalizing content. These two examples are described herein next for illustrative purposes. However, the networking environment 100 similarly supports other content-related application.

In a marketing campaign example, the user devices 102A-102N represent end user devices. The server 104 represents one or more servers that host a web site. The network 106 includes the Internet. A user operates a computing device to access a web page of the web site over the Internet. The web page includes space for an advertisement. Potential advertisements are available for insertion in the advertisement space. For each web page variation, the content personalization system 112 predicts the likelihood of a user conversion. In one instance, the web page variation having the highest likelihood is selected. The respective advertisement is inserted in the web page such that the selected web page variation is presented to the user via the computing device.

In a content personalization example, the user devices 102A-102N represent end user devices. The server 104 represents a content source that stores different versions of content 108. The network 106 includes the Internet. In this example, a user operates a computing device to access content from the content source via a web browser or some or application local to the computing device. For each content version, the content personalization system 112 predicts a user response. In this example, the user response represents whether the user would be positively receptive of or is actually looking for the content version. The content personalization system 112 selects the content version that has a high likelihood for the user response. That content version is provided from the server 104 to the computing device.

Figure 2:
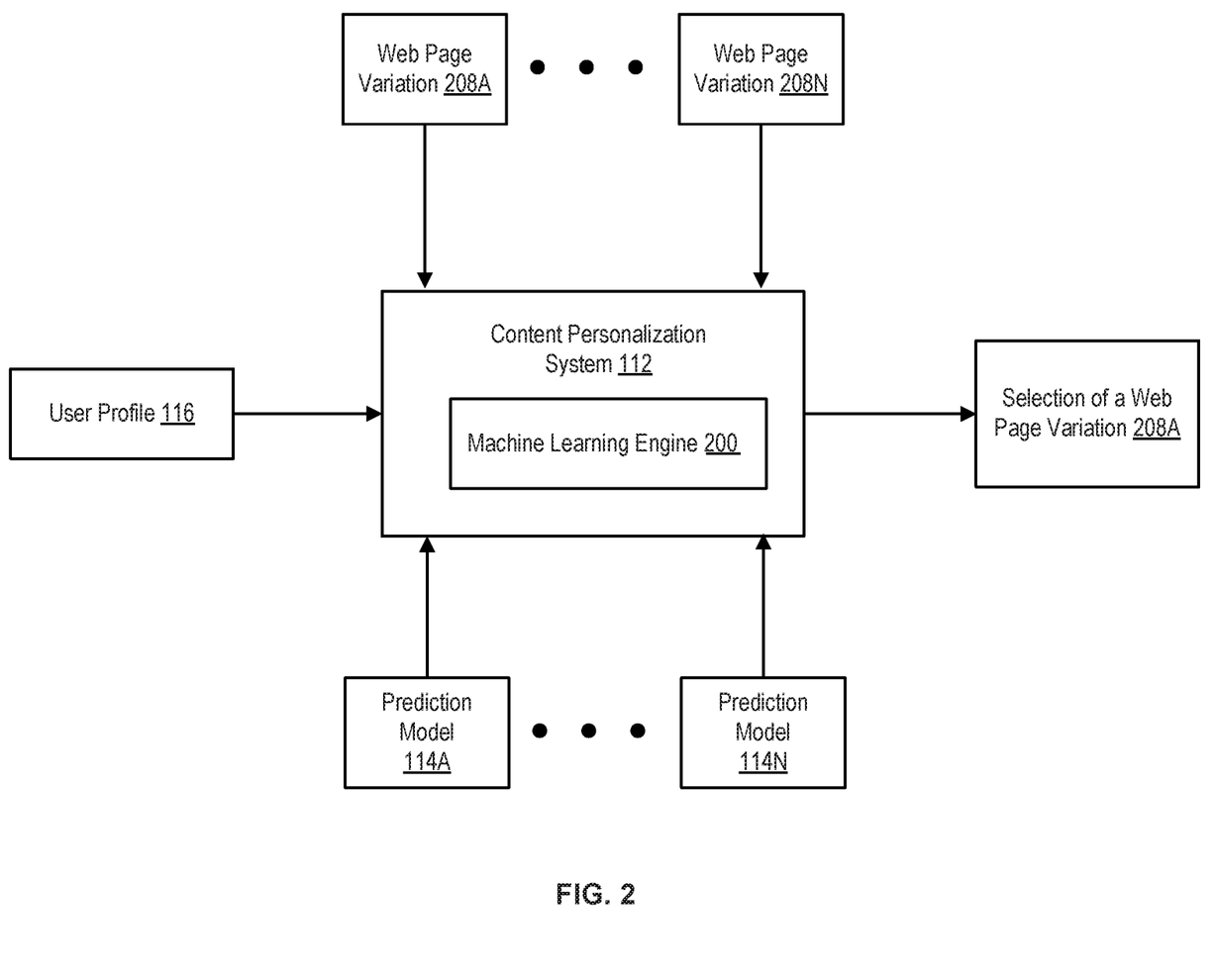
FIG. 2 is a general flow diagram for determining customized web content according to an aspect of the present disclosure.

FIG. 2 is a flow diagram illustrating the content personalization system 112 of FIG. 1 receiving information to predict a user response to a content presentation. In the interest of clarity of explanation, an example of web page variations 208A-208N is described in connection with FIG. 2 to represent the content 108 of FIG. 1. However, the aspects are not limited as such. Instead, the aspects similarly apply to other types of content.

The web page variations 208A-208N represent variations to web page content. In one example, the web page variations relate to different versions of content displayed within the web page, such as a specific advertisement inserted in an advertisement space of the web page. In another example, the web page variations 208A-208N relate to a placement or format of content within the web page. The different web page variations 208A-208N are available to the content personalization system 112. For example, the web page variations 208A-208N are stored in memory or a storage device included in or accessible to the content personalization system 112. In some aspects, the prediction models 114A-114N are also available to the content personalization system 112 and are similarly stored in the memory or a storage device included in or accessible to the content personalization system 112. In one example, the prediction models 114A-114N correspond to the web page variations 208A-208N, respectively. Each prediction model 114A-114N includes a set of decision trees for predicting a likelihood that a user corresponding to the user profile 116 will perform a certain action (e.g., a conversion) if presented the corresponding web page variation 208A-208N. The prediction models 114A-114N may be generated by a prediction model generation module of the content personalization system 112 and used by the machine-learning engine 200 to determine such predictions. In other aspects, the prediction models 114A-114N may be generated by the machine-learning engine 200.

The user profile 116 is accessed by the content personalization system 112 in response to an interaction of the user device with a server hosting the web page (e.g., a request by a user device 102A-102N to view content 108 as described with respect to FIG. 1). The content personalization system 112 may access the user profile 116 from one or more locations. In one example, the user profile 116 includes information retrieved from the user device based on the request and information corresponding to the user stored in a storage device accessible to the content personalization system 112. For instance, the request includes metadata that identifies the network and web browser from which the user device is accessing the server and the previous URL visited by the user device. The user request also includes metadata that identifies the user device, such as the IP address of the user device.

In some instances, depending on the user device settings and the consent of a user of the user device, information about the user is obtained by the content personalization system 112 (e.g., the user's age, location, and certain preferences) for the user profile 116. The user profile 116 also includes historical user data and historical content data if the user device or user has previously requested content from the content personalization system 112. For example, the information obtained by the content personalization system 112 for the user profile 116 is stored in a storage device as historical user data.

The content personalization system 112 also tracks the user's visit to determine which content hosted by the server is viewed by the user and certain user responses to viewing the presentation. For example, the tracked information includes how long the user remained on a website, how many web pages the user viewed on the website, how long the user viewed each web page, and what, if any, actions the user took on each web page (e.g., a product purchase). The content personalization system 112 stores the tracked information as historical content data in the database. In some aspects, the tracked information is associated with the user or user device in the database for future reference using an identifier, such as the user device's IP address.

In one example, the user profile 116 is evaluated against each of the prediction models 114A-114N. The prediction model 114A-114N that predicts a high chance that the user will convert, or a high expected order value, is selected and the corresponding web page variation 208A-208N is transmitted to the user device. For instance, the content personalization system 112 evaluates the user profile 116 against the prediction models 114A-114N and determines that the prediction model 114A indicates a high likelihood that the user will purchase a product if presented the web page variation 208A. In some aspects, the content personalization system 112 retrieves the web page variation 208A and transmits the web page variation 208A to the user device to be displayed on the user device's user interface. In other aspects, the content personalization system 112 generates the web page variation 208 by retrieving stored content associated with the web page variation 208A (e.g., a targeted advertisement) and positions the content at a designated location on a web page (e.g., a banner), then transmits the web page variation 208A to the user device.

In some aspects, the user profile 116 is evaluated against the prediction models 114A-114N using the machine-learning engine 200 implemented by the content personalization system 112. The machine-learning engine 200 is trained to predict responses to the web page variations 208A-208N (e.g., user conversions for presenting different advertisements). A response is accordingly predicted for each of the web page variations 208A-208B. The content personalization system 112 determines a satisfactory response out of the predicted responses. For example, the satisfactory response corresponds to the one having the highest likelihood of user conversion. In another example, the satisfactory response corresponds to one of the highest likelihoods of conversion (e.g., the second or third highest likelihood of conversion). The content personalization system 112 identifies the web page variation responsible for the satisfactory response. Accordingly, a selection of that particular web page variation (e.g., web page variation 208A) is made. The web page is provided to the user device in response to the interaction between the user device and the server.

Figure 3:
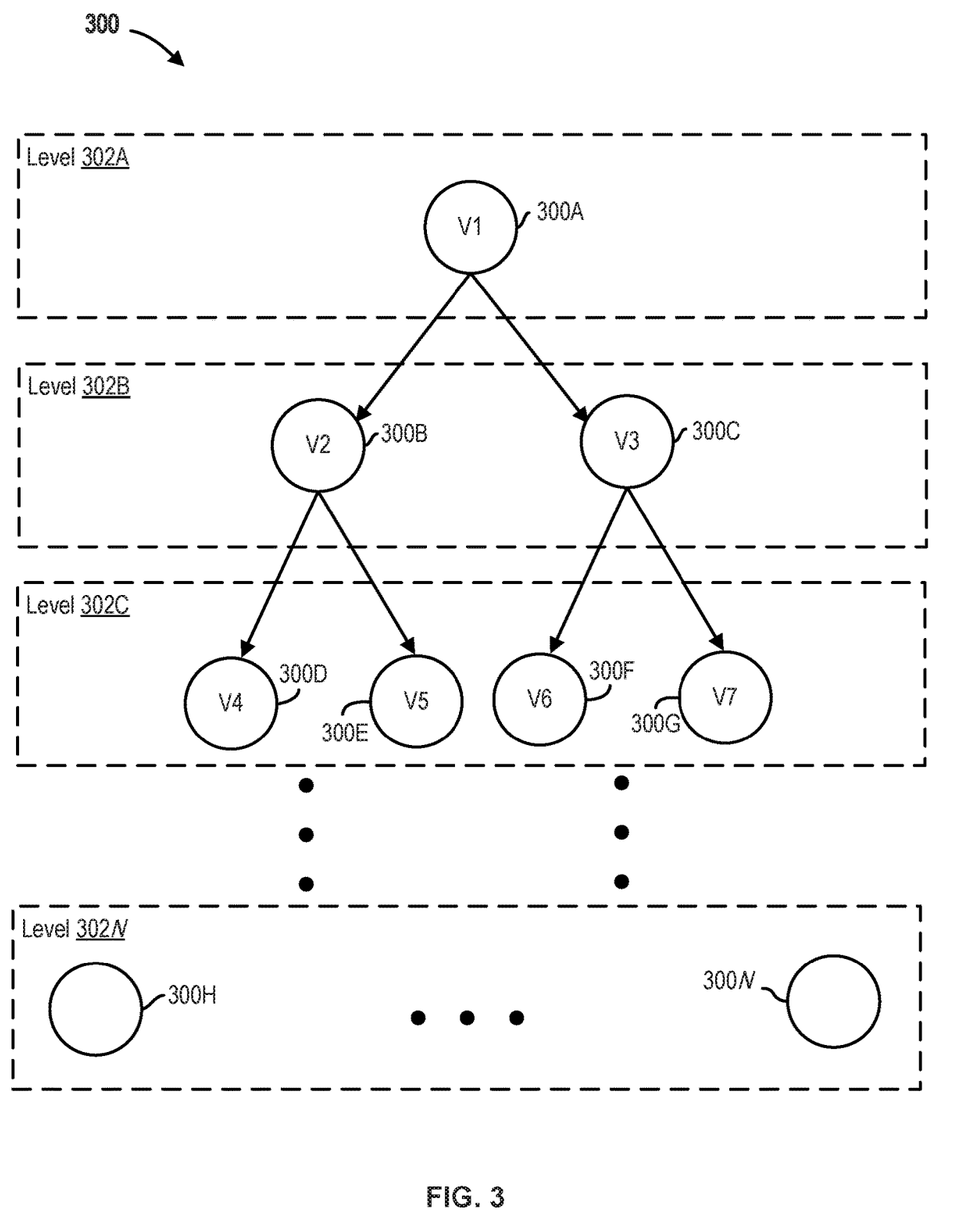
FIG. 3 is an example of a prediction model for determining customized web content according to an aspect of the present disclosure.

FIG. 3 is an example of a decision tree 300 that is included in a prediction model corresponding to a variation of web content. The prediction model that includes the decision tree 300 may also include multiple decision trees corresponding to random subsamples of the data from a data set. The decision tree 300 is made up of multiple nodes 300A-300N. At each node is a corresponding variable V1-VN corresponding to a classification or decision to be made that causes a split from the node into multiple nodes extending from the node on branches of the decision tree 300. In one example, each node of the decision trees corresponds to a single variable (e.g., the amount of time since the user last visited the site). In another example, each node of the decision tree corresponds to a function of one or more variables (e.g., a constant multiplied by the time since the user last visited and a second constant multiplied by the number of times the user visited the site).

For example, the decision tree 300 includes a root node 300A in a first level, level 302A. The variable V1 corresponds to whether a visitor to the web page variation corresponding to the prediction model is visiting the web page variation from a third-party website related to retail (e.g., a department store website). Node 300A is split into node 300B and node 300C, and the visitor is directed to node 300B or node 300C in level 302B depending on the visitor's web browsing history. For example, visitors accessing the web page variation from a department store or other retail website are directed to node 300B, and visitors accessing the web page variation from other websites are directed to node 300C. Node 300B is split into node 300D and node 300E in level 302C depending on the value of the variable V2 at node 300B, and node 300C is split into node 300F and node 300G in level 302C depending on the value of the variable V3 at node 300C. The nodes 300D-300G may be similarly split based on values of the variables V4-V7 until a branch terminates at a node. For example, the decision tree 300 includes terminal nodes 300H-300N in level 302N.

In some aspects, a statistic corresponds to each of the nodes 300A-300N depending on historical data used to train the prediction model. For example, a statistic at the root node 300A of the decision tree 300 corresponds to a likelihood that a visitor to the web page variation, generally, will make a purchase (e.g., a 10% likelihood). A statistic at node 300B corresponds to a likelihood that a visitor accessing the web page variation from a retail website will make a purchase (e.g., an 8% likelihood) and a statistic at node 300C corresponds to a likelihood that a visitor accessing the web page variation from another website will make a purchase (e.g., a 13% likelihood).

Continuing similarly through the branches of the decision tree 300 and the respective nodes until level 302N, the statistics for each terminal node 300H-300N correspond to the likelihood that a visitor will make a purchase if the visitor meets the criteria for splitting the variables at the nodes along each branch of the decision tree 300 traversed from the root node 300A to the corresponding terminal node The prediction of the decision tree 300 is averaged with predictions of other decision trees in the prediction model to generate a predicted likelihood that the visitor will make a purchase.

The decision tree 300 is grown through decision tree induction using training records corresponding to historical data that includes samples of data drawn from an unknown probability distribution. In aspects of the present disclosure, the decision tree 300 and the prediction model including the decision tree are used for regression, and the variables V1-VN used in the prediction model are numerical. A splitting criterion is applied to the decision trees in the prediction model to control the growth of the decision trees. For example, the splitting criterion indicates a rule dictating whether a node 300A-300N may be further split into branches having additional nodes or whether the node 300A-300N are terminal nodes. By applying the splitting criterion, the number of nodes in each decision tree and the number of levels in the decision trees of the prediction model are reduced, thereby reducing the size of the prediction model.

In one example, the splitting criterion includes requiring a minimum number of positive responses and negative responses on each side of the split of a node in the decision tree 300. The positive responses correspond to a conversion (e.g., a purchase) and the negative responses correspond to a non-conversion (e.g., visiting without a purchase).

Table 1 depicts a training dataset to illustrate how the splitting criterion is applied while growing a decision tree used to predict the probability of a conversion.

TABLE 1

First Example of Training Records

| $x_i$ | | | | | | | | |
|---|---|---|---|---|---|---|---|---|
| 1.2 | 1.7 | 1.7 | 2.9 | 10.1 | 17.5 | 32.3 | 61.3 | 98.0 |

| y | | | | | | | | |
|---|---|---|---|---|---|---|---|---|
| 0 | 0 | 1 | 1 | 1 | 0 | 1 | 0 | 1 |

For example, each training record in the dataset consists of a set of d variables represented by a d-dimensional vector, x, and a scalar response, y, which can be a "0" or a "1" indicating a non-conversion or a conversion, respectively. Per the Random Forest® algorithm, at each node in the decision tree, the splits are considered on some subset of the dimensions of x, denoted by $\{x_i\}$, where each $x_i$ corresponds to a variable. For each $x_i$ that is numeric, the training records are sorted by increasing order of the value of $x_i$, and the dataset including only the values of $x_i$ vs. y is extracted to consider potential split points between the distinct values of $x_i$. If the split criterion specifies that for each numeric variable, each side of a split must have at least 2 training records where the response is negative (e.g., y=0) and at least 2 training records where the response is positive (e.g. y=1), then the possible splits on values of variable $x_i$ for consideration in growing a decision tree in the example shown in Table 1 are limited to $x_i$ between 2.9 and 10.1, and $x_i$ between 10.1 and 17.5.

Figure 4:
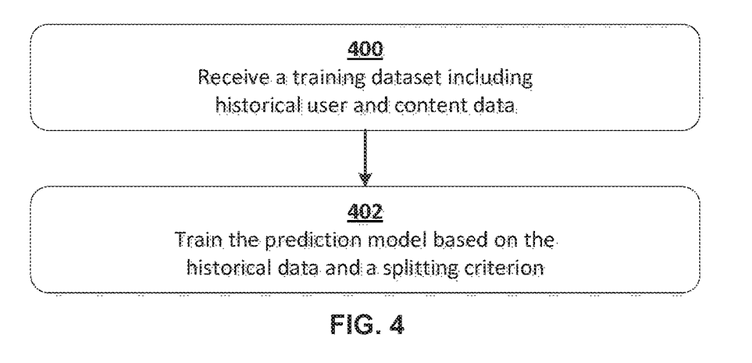
FIG. 4 is a flow chart of an example process for training a prediction model according to an aspect of the present disclosure.
Figure 5:
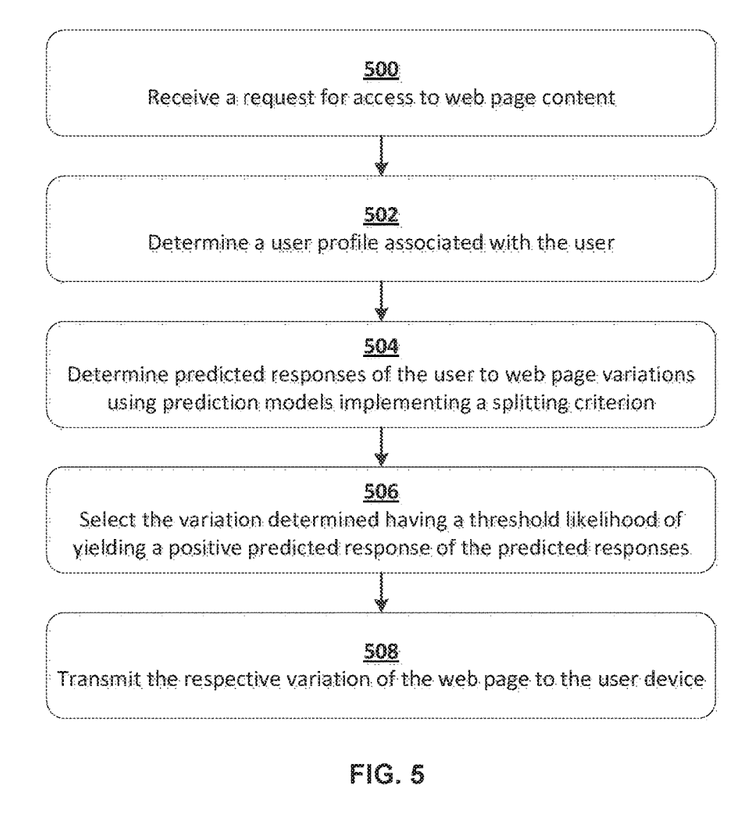
FIG. 5 is a flow chart of an example process for determining customized web content using prediction models according to an aspect of the present disclosure.

FIGS. 4 and 5 illustrate example flows related to determining customized web content for a user according to aspects of the present disclosure. In particular, FIG. 4 is a flow chart of a process for training a prediction model to grow decision trees. FIG. 5 is a flow chart of a process for determining customized web content using a prediction model. While the operations are illustrated in a particular order, it should be understood that no particular order is necessary and that one or more operations may be omitted, skipped, and/or reordered. In the interest of clarity of explanation, a content personalization system 112 is illustrated as performing the illustrative operations. The content personalization system 112 implements some or all of the components and modules illustrated in FIGS. 1-2. Nevertheless, other systems, or specific modules hosted on such systems, may be configured to implement one or more of the operations and/or one or more steps of the operations.

In block 400 of FIG. 4, a training dataset is received. The training dataset includes historical data corresponding to the user and content. In some aspects, the historical data is retrieved by the content personalization system 112 from a database or other storage means accessible to the content personalization system 112. The historical user data corresponds to data collected about a user from previous visits to a web page and includes information corresponding to the user device (e.g., an IP address, previous browsing history, or actions taken during previous visits to the website) and the user operating the user device (e.g., age, physical location, or preferences).

In block 402, a prediction model is trained based on the training dataset. For example, the training dataset typically includes many known example vectors, each of which is of the form $(x_1, x_2, \ldots x_d, y)$ where variables $x_1, x_2, \ldots x_d$ correspond to user data such as historical features observed just before a particular user was exposed to one variation of the content, and variable y corresponds to the observed historical response of that user to the exposure. In some aspects, a different training dataset may be used for each variation of the webpage. In other aspects, there may be only one training dataset that includes the combined data from all variations of the web page. In either case, a Random Forest® algorithm, or a similar algorithm for creating decision trees, is applied to create the prediction models, each prediction model including multiple decision trees. A splitting criterion is applied to the algorithm to control the growth of the decision trees in each prediction model. For example, the splitting criterion may include a rule or instruction requiring that a minimum number of "positive" training records (e.g., "1" for a user conversion) and a minimum number of "negative" training records (e.g., "0" for no user conversion) be included on each side of a split. The splitting criterion applies when the variable being split is numeric, when the decision tree, or forest, is being used for regression, and when the value of the response variable in the training dataset is a sample drawn from unknown probability distribution.

Turning now to FIG. 5, which illustrates a process for determining customized web content using prediction models, a request for access to web page content is received in block 500. In some aspects, the request is received at a server hosting variations of a web page. The request is received from a user via a user device communicatively connected to the server via a network. The server includes the content personalization system, which receives the request to determine which variation of the web page to transmit to the user device. In some aspects, the content personalization system is integral to the server and receives the request from the user device at the server. In other aspects, the content personalization system is separate from, but communicatively connected to, the server and receives the request from the server.

In block 502, a user profile associated with the user is determined. For example, the content personalization system accesses features in response to receiving the request for access to the web content. In some aspects, the content personalization system may extract the features from the request. Some of the features are received from the user device such as, for instance, the IP address of the user device. Other features are identified from database locally or remotely accessible to the content personalization system. For instance, the user profile may include historical user and content data based on previous visits by the user device or the user to the server. In some aspects, the content personalization system queries the database using features received from the user device (e.g., the IP address) as an identifier associated with the stored information to access the stored features.

In block 504, a predicted response to each variation of the web page is determined. A response is associated with the user and includes, for example, the response of the user when receiving and interacting with the content of the web page variation. In an example, the content personalization system predicts the response based on a prediction model. Likelihoods of the response are estimated by the prediction models through decision trees trained to evaluate the user profile against the prediction models. Each likelihood corresponds to a potential content presentation and indicates a predicted response to the potential content presentation given the features of the user profile.

The decision trees used in each prediction model may be generated using a splitting criteria that requires a minimum number of positive responses and negative responses on each side of the split of a node in the decision tree. In some aspects, the splitting criterion may require that the minimum number of positive responses and the minimum negative responses on each side of a decision tree split be the same (e.g., at least three conversions and at least three non-conversions). In other aspects, the splitting criterion may require that the minimum number of positive responses and the minimum negative responses on each side of a decision tree split be different (e.g., at least three conversions and at least two non-conversions, or at least two conversions and at least four non-conversions). The decision trees in each prediction model are averaged to yield a statistical likelihood, based on information in the user profile, that the user will convert (e.g., make a purchase).

In block 506, the web page variation having a threshold likelihood (e.g., the highest likelihood) of yielding a positive response is selected. For instance, the prediction model yielding the highest value corresponds to the web page variation that is most likely to yield a positive response (e.g., a purchase by the user). In block 508, the selected web page variation is transmitted to the user device to allow the user to view the web page content of the web page variation through a user interface of the user device. The web page variation is transmitted through the network 106 communicatively connecting the user device and the server.

Figure 6:
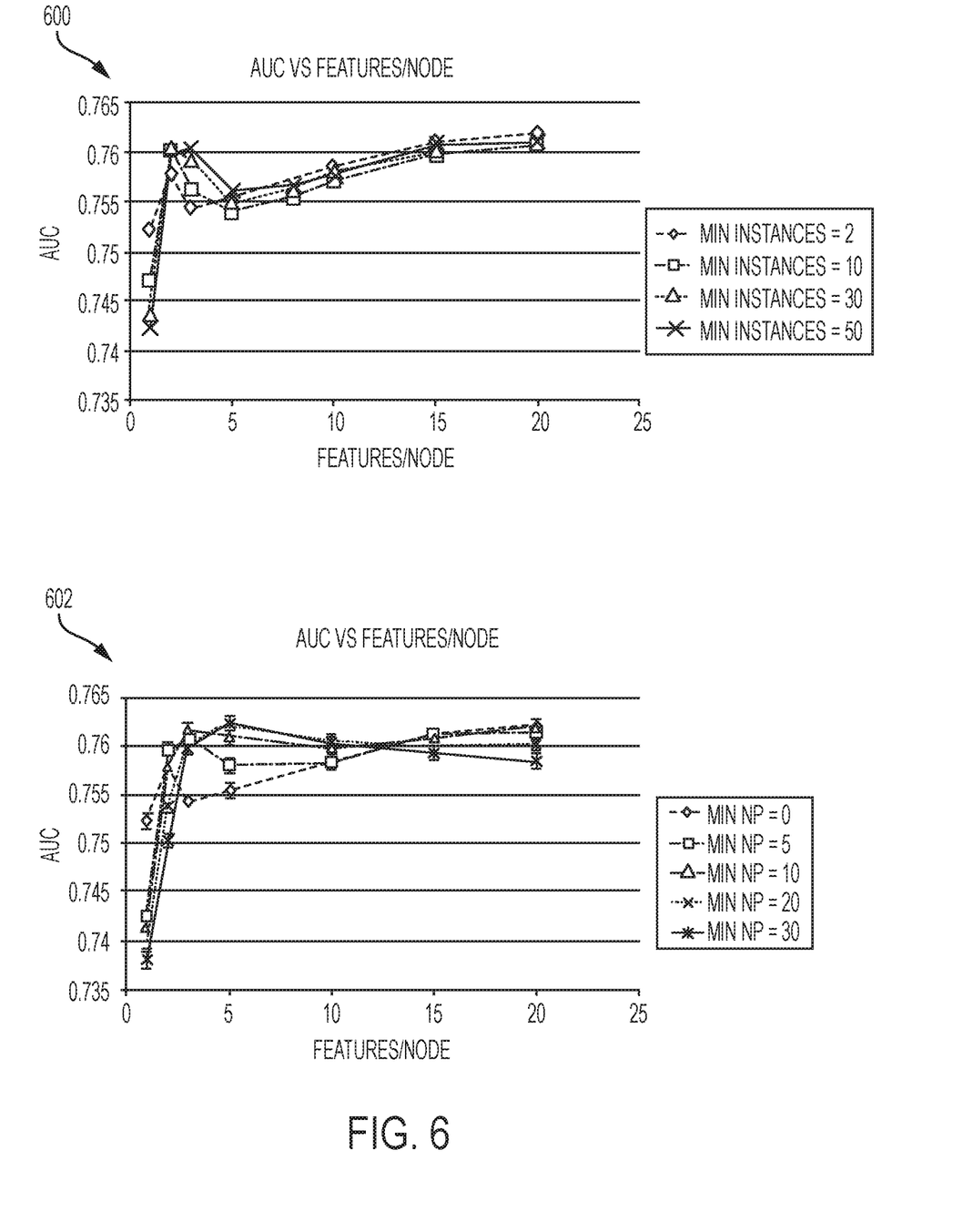
FIGS. 6 through 8 are graph comparisons of sample test results of prediction models implementing a splitting criterion according to an aspect of the present disclosure.
Figure 7:
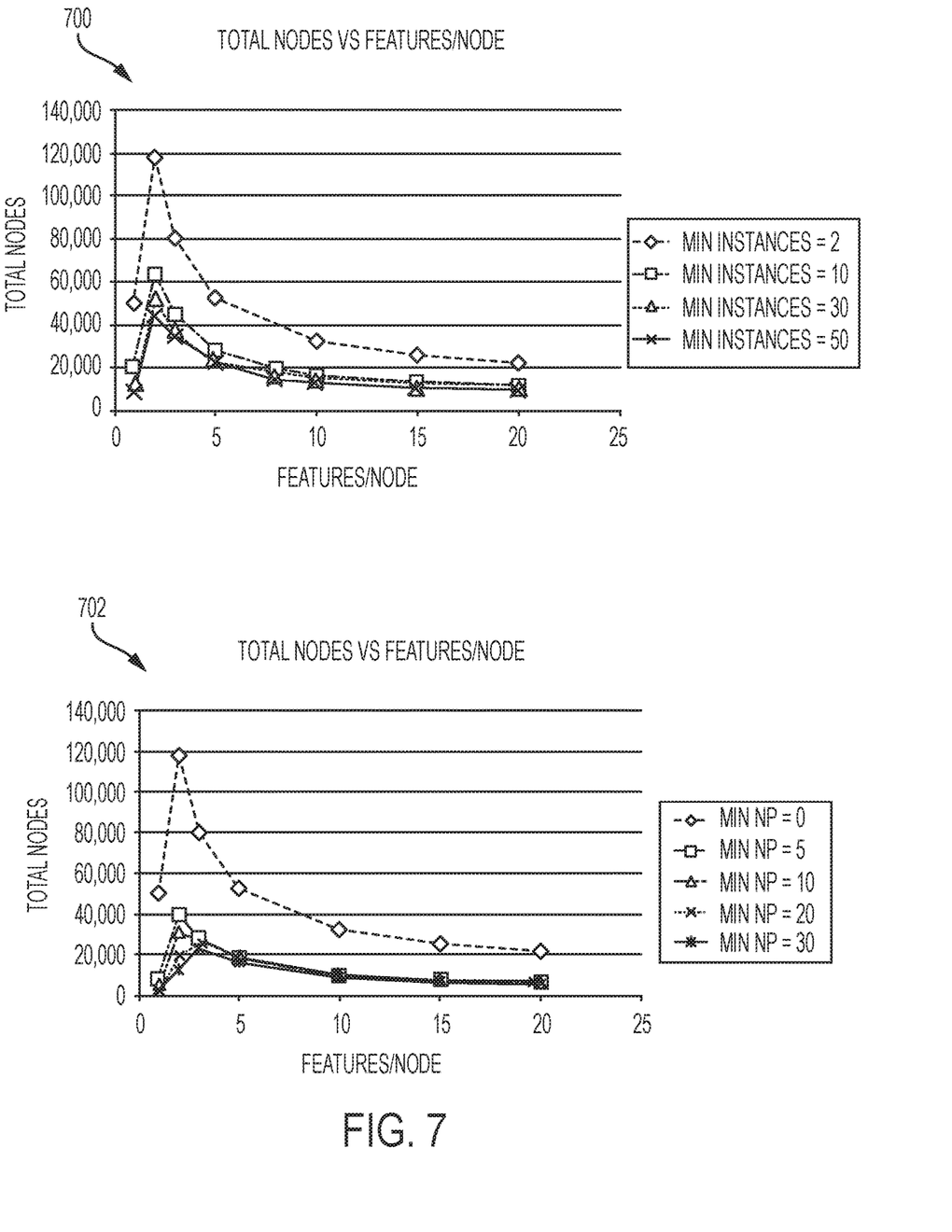
Figure 8:
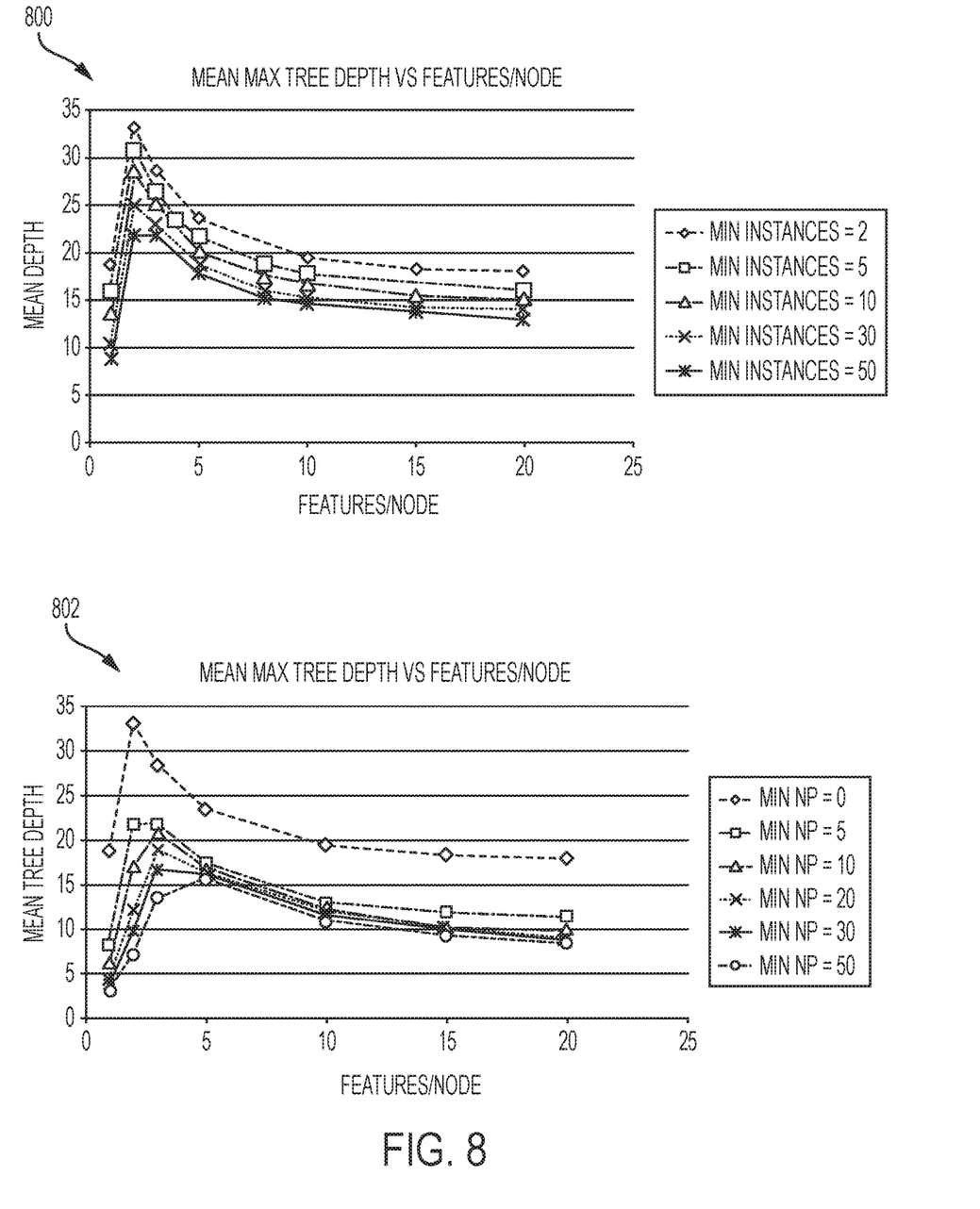

Turning to FIGS. 6 through 8, examples are test results associated with generating a prediction model using a splitting criterion are illustrated. To better understand the test results, the test setup is described herein next.

In the test setup, 216,642 historical visit records were collected for a web campaign targeting the retail industry. In the campaign that produced these records visitors were randomly divided into two groups—a control group that was shown one of the website variations uniformly at random, and a target group that was shown the variation that was considered to have the highest chance of conversion upon each visit. To eliminate bias induced by targeting, and to ensure that the distribution of visitors was representative of the entire population of visitors who visited the campaign, the 216,642 historical visit records used in this test were collected only from visitors who were in the control group and who were shown one specific web site variation. These unbiased records were further divided by time into training records and testing records. All visits prior to a certain time were used to train the models, and all visits after that time were used to test the models. This was done to ensure that any time-correlated variables in the testing set could not artificially inflate the measurements of model performance. Approximately 68.2% of the 216,642 historical records were in the training set, and 31.8% of the historical records were in the testing set. All non-numeric variables in the data were converted to numeric variables by replacing the categorical values by their average conversion rate. The campaign was set up to measure the conversion rate of each visitor on each visit so the response, y, was either a "0" or "1" for each record indicating a non-conversion or a conversion, respectively. Because the number of records that resulted in a conversion (e.g., positive instances) was much smaller than the number of records that did not result in a conversion (e.g., negative instances), the positive instances in the training set were "up-sampled" by randomly repeating each positive record on average 6.5486 times, and the negative instances in the training set were down-sampled by randomly sampling the negative instances (without replacement) at a rate of 91.396%. This sampling process yielded roughly 10% positive instances in the training data set. Additional steps were taken to normalize the results of the models and the predictions for the testing set to account for this up and down sampling.

Prediction models were built on the training data set using the Random Forest® algorithm. The algorithm was configured to generate 300 trees, and to generate a regression model representing the predicted probability of conversion. The algorithm was additionally configured to randomly select a certain number of features (variables) for each split when building the decision trees. The number of randomly selected features, m, varied from 1 to 20 during different tests. The standard metric of the "area under the curve" (AUC) of the "receiver operating characteristic" (ROC) was used to characterize how well the model that was built on the training data predicted the results on the testing data. To reduce the variation in the results, the process of training a model and characterizing how well the model predicted results on the testing data was repeated 50 times for each value of m, and for each different split criterion. All results are plots of the mean of the resulting AUCs. In most cases, the standard deviation of the mean AUC over the 50 iterations was too small to be visible on the resulting plots. Accordingly, the error bars were omitted in the figures.

FIGS. 6-8 each show graphs comparing the prior art (e.g., requiring a minimum number of instances on each side of the split without regard to whether they are negative or positive instances) to the splitting criterion described herein (e.g., requiring a minimum number of positive and negative instances on each side of the split). In FIG. 6, the two graphs, graph 600 and graph 602, show the AUC versus the number of randomly selected features to be considered for each split (referred to above as m) for the prior art and the new splitting criteria, respectively. In graph 600, there is a sharp peak in the AUC when m=2 or 3, followed by a much broader peak in AUC that reaches a maximum at around m=20. The AUC increases slightly in the region around the sharp peak as the minimum number of instances per side of the split is increased from 2 to 50, but increasing the minimum number of instances required on each side of a split from 2 to 50 does not have a very large effect on the AUC. This indicates the model accuracy is not strongly affected by the technique described in the prior art in the range of parameters considered. In the graph 602, the effect of the new technique described herein limiting splits to have a minimum number of negative and positive instances on each side, broadens and shifts the peak in the AUC when m is between 2 and 5, slightly increases the maximum AUC obtained in the first peak near m=5 features per split, and reduces the AUC slightly (about 0.5%) when m=20.

In FIG. 7, the two graphs, graph 700 and graph 702, show the total number of nodes in the prediction model versus the number of randomly selected features to be considered for splitting at each node (m) for both the prior art, and the new technique described herein, respectively. In graph 700, the total number of nodes in the prediction model is as high as 117,600 when m=2 and the minimum number of instances per split side is two. The total number of nodes decreases to 22,100 nodes when m is increased to 20. A similar behavior is found as the minimum number of instances per side of the split is increased from 2 to 50. Requiring 50 instances per split side reduces the total number of nodes to 44,400 near the peak at m=2 and to 9,400 when m=20. In graph 702 corresponding to an aspect of the present disclosure, the total number of nodes is significantly lower than shown in the graph 700 for all except the case where there is no limit on the minimum number of negatives and positives on each side of a split (denoted "min np" in the graph legend). As "min np" is increased from 0 to 30, the total number of nodes in the model is reduced from 117,600 to 23,500 near the peak at m=2, and the total number of nodes in the model is reduced from 22,100 to only 5,700 at m=20. This shows that the new technique significantly reduces the number of nodes in the model as compared to the prior art in all ranges of m. Table 2 summarizes the comparison of the graphs 700, 702:

TABLE 2

Comparison of the total number of nodes in the prediction model at various values of m for the splitting criteria corresponding to the prior art vs. the splitting criteria corresponding to the new technique.

| Features/node(m) | Not Limited | Min Instances per Side (prior art) | Min Neg. & Pos. Instances per Side (new technique) | Percent Improvement |
|---|---|---|---|---|
| Peak near (m = 2) | 117,600 | 44,400 | 23,500 | 47.1% |
| m = 20 | 22,100 | 9,400 | 5,700 | 39.4% |

In FIG. 8 the two graphs, graph 800 and graph 802, show the mean maximum tree depth for the prediction model versus the number of randomly selected features to be considered for splitting at each node (m) for both the prior art, and the new technique described herein, respectively. In graph 800 there is a peak in the average tree depth for m in the range of 2 to 3. The maximum tree depth decreases with increasing m, and with more instances required on each side of a split. The average tree depth decreases from 33.0 to 21.8 near the peak at m=2, and from 18.0 to 13.0 at m=20 as the minimum number of instances required on each side of a split is increased from 2 to 50. In graph 802, representing the technique according to aspects of the present disclosure, the mean maximum tree depths are significant lower than those from the prior art as shown in graph 800, except when "min np"=0 which is the case where the new technique is not applied. The mean tree depth at m=20 features per node is reduced from 18.0 to 8.4, whereas the mean tree depth shown in the graph 800 (the prior art) at m=20 is reduced only to 13. Table 3 summarizes the results shown on graphs 800 and 802:

TABLE 3

Comparison of the mean maximum tree depths in the prediction model at various values of m for splitting criteria corresponding to the prior art vs. splitting criteria corresponding to the new technique.

| Features per node (m) | Not Limited | Min Instances per Side (prior art) | Min Neg. & Pos. Instances per Side (new technique) | Percent Improvement |
|---|---|---|---|---|
| Peak near (m = 2) | 33.0 | 21.8 | 15.6 | 28.4% |
| m = 20 | 18.0 | 13.0 | 8.4 | 35.4% |

The results shown in FIGS. 6 through 8 show that the model size, which is proportional to the total number of nodes, is 39% to 47% smaller than the prior art using the new technique, and the average maximum tree depth, which is proportional to the time required to compute the probability of conversion, is 28% to 35% smaller than the prior art using the new technique. Similar experiments were performed on two other data sets from marketing campaigns in the banking and travel industries. These results, though not detailed herein, show a reduction in the total number of nodes from 39% to 60%, and a reduction in the average maximum tree depth of from 28% to 42%. This shows that the improvements in model size and time required to score new visitors against the models are not just specific to one data set, but are very general to marketing campaigns in widely different business sectors.

Figure 9:
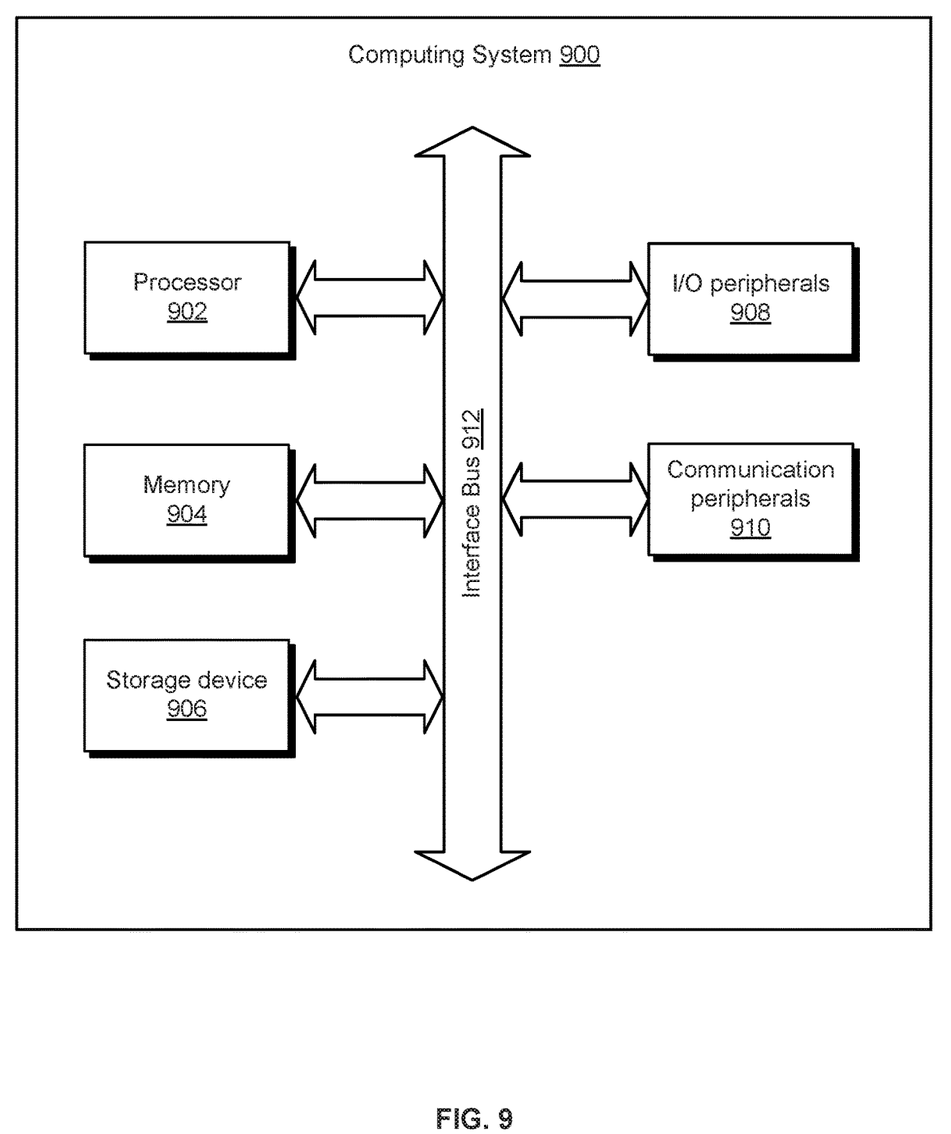
FIG. 9 is a block diagram of an example server device for determining customized web content according to an aspect of the present disclosure.

A suitable computing system may be programmed to perform the operations described herein. For example, FIG. 9 illustrates example components for implementing some or all of the components of the computing environment of FIG. 1. Each of the user devices 102A-102N, server 104, or content personalization system 112 implements some or all of the illustrated components. Although these components are illustrated as belonging to a same computing system 900, the computing system 900 can be distributed.

The computing system 900 includes at least a processor 902, a memory 904, a storage device 906, input/output peripherals 908, communication peripherals 910, and an interface bus 912. The interface bus 912 is configured to communicate, transmit, and transfer data, controls, and commands among the various components of the computing system 900. The memory 904 and the storage device 906 include computer readable storage media, such as RAM, ROM, electrically erasable programmable read-only memory (EEPROM), hard-drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 904 and the storage device 906 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing system 900.

Further, the memory 904 includes an operating system, programs, and applications. The processor 902 is configured to execute the stored instructions and includes, for example, a logical processing unit, a microprocessor, a digital signal processor, and other processors. The memory 904 and/or the processor 902 can be virtualized and can be hosted within another computing system of, for example, a cloud network or a datacenter. The input and output peripherals 908 include user interfaces such as a keyboard, screen, microphone, speaker, other input/output devices, and computing components such as graphical processing units, serial ports, parallel ports, universal serial bus, and other input/output peripherals. The input/output peripherals 908 are connected to the processor 902 through any of the ports coupled to the interface bus 912. The communication peripherals 910 are configured to facilitate communication between the computing system 900 and other computing devices over a communications network and include, for example, a network interface controller, modem, wireless and wired interface cards, antenna, and other communication peripherals.

While the present subject matter has been described in detail with respect to specific aspects thereof, it will be appreciated that those skilled in the art, upon attaining an understanding of the foregoing may readily produce alterations to, variations of, and equivalents to such aspects. Accordingly, it should be understood that the present disclosure has been presented for purposes of example rather than limitation, and does not preclude inclusion of such modifications, variations, or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying," or the like, refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, or steps. Thus, such conditional language is not generally intended to imply that features, elements or steps are in any way required for one or more examples or that one or more examples necessarily include logic for deciding, with or without author input or prompting, whether these features, elements or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method usable by a machine-learning system to transmit customized content via a network, the computer-implemented method comprising:

determining, by a processing device and in response to receiving a request for web content from a user device that is communicatively coupled to the processing device via the network, user information associated with a user of the user device, wherein the user information is used to determine variables associated with the user;

determining, by the processing device, likelihoods of predicted responses of the user to each variation of a plurality of variations of the web content using prediction models and the user information, wherein each prediction model is configured to predict a response of the user to a variation of the web content corresponding to the prediction model and includes one or more decision trees, wherein a decision tree among the one or more decision trees comprises a set of nodes, a node of the set of nodes corresponds to at least one of the variables, and the node is split into multiple nodes according to a value of the at least one variable and using a splitting criterion requiring: (1) training records falling on one side of a split point contain a minimum number of positive responses to a content corresponding to the variation of the web content and a minimum number of negative responses to the content corresponding to the variation of the web content and (2) training records falling on the other side of the split point contain the minimum number of the positive responses and the minimum number of the negative responses;

selecting, by the processing device, a variation of the plurality of variations determined to have a threshold likelihood of yielding a positive predicted response; and transmitting, by the processing device, the selected variation to the user device via the network.

2. The computer-implemented method of claim 1, further including:

receiving a training dataset including historical user information corresponding to a plurality of users and historical content data corresponding to one or more variations of the plurality of variations, wherein the training records are obtained from the training dataset; and training the prediction models using the training dataset and the splitting criterion.

3. The computer-implemented method of claim 1, wherein determining the user information associated with the user includes extracting the user information from the request, the user information including at least one of an internet protocol address associated with the user, a browser type associated with the user device, or a previous universal resource locator accessed by the user device.

4. The computer-implemented method of claim 1, wherein determining the user information associated with the user includes retrieving historical user information from a database that is accessible to the processing device, the historical user information corresponding to one or more previous visits to a webpage hosted by a server including the processing device.

5. The computer-implemented method of claim 4, wherein the historical user information is stored in the database in a manner that associates the historical user information with the user using a user identifier, the user identifier being extractable from the request.

6. The computer-implemented method of claim 5, wherein determining the likelihoods of the predicted responses includes evaluating the user information against each of the prediction models, wherein the positive predicted response corresponds to a statistical likelihood, based on the evaluation, that the user will perform a desired action when presented the respective variation.

7. The computer-implemented method of claim 1, wherein selecting the variation includes:

comparing respective statistical likelihoods, for each of the prediction models, that the user will perform a desired action when presented each variation of the plurality of variations; and selecting the variation of the plurality of variations corresponding to one of the highest statistical likelihoods of the respective statistical likelihoods.

8. The computer-implemented method of claim 7, wherein the desired action corresponds to a user purchase subsequent to viewing the variation of the web content.

9. The computer-implemented method of claim 1, wherein the prediction models correspond to an expectation of a monetary value for one or more of: a purchase order, an item within the purchase order, or a service request.

10. A method comprising:

a step for determining, by a processing device and in response to receiving a request for web content from a user device, user information associated with a user of the user device wherein the user information is used to determine variables associated with the user;

a step for determining, by the processing device, likelihoods of predicted responses of the user to each variation of a plurality of variations of the web content using prediction models and the user information, wherein each prediction model is configured to predict a response of the user to a variation of the web content corresponding to the prediction model and includes one or more decision trees, wherein a decision tree among the one or more decision trees comprises a set of nodes, a node of the set of nodes corresponds to at least one of the variables, and the node is split into multiple nodes according to a value of the at least one variable and using a splitting criterion requiring: (1) training records falling on one side of a split point contain a minimum number of positive responses to a content corresponding to the variation of the web content and a minimum number of negative responses to the content corresponding to the variation of the web content and (2) training records falling on the other side of the split point contain the minimum number of the positive responses and the minimum number of the negative responses;

a step for selecting, by the processing device, a variation of the plurality of variations determined to have a threshold likelihood of yielding a positive predicted response; and a step for transmitting, by the processing device, the selected variation to the user device via a network.

11. The method of claim 10, further comprising:

a step for training the prediction models using a training dataset and the splitting criterion, the training dataset including historical user information corresponding to a plurality of users and historical content data corresponding to one or more variations of the plurality of variations, wherein the training records are obtained from the training dataset.

12. The method of claim 10, further comprising a step for extracting a user identifier from the request, wherein the step for determining the user information associated with the user of the user device includes a step for retrieving historical user information from a database using the user identifier.

13. The method of claim 10, wherein the step for determining the likelihoods of the predicted responses includes a step for evaluating the user information against each of the prediction models, wherein the positive predicted response corresponds to a statistical likelihood, based on the evaluation, that the user will perform a desired action when presented a variation of the plurality of variations, wherein each of the prediction models corresponds to a different variation of the plurality of variations.

14. The method of claim 10, wherein the step for selecting the variation comprises:

a step for comparing respective statistical likelihoods, for each of the prediction models, that the user will perform a desired action when presented each variation of the plurality of variations; and a step for selecting the variation of the plurality of variations corresponding to one of the highest statistical likelihoods of the respective statistical likelihoods.

15. A computer-implemented event response prediction system, comprising:

a storage device comprising non-transitory storage media for storing (i) a set of data corresponding to historical information associated with a plurality of potential events, (ii) a splitting criterion, wherein the splitting criterion requires (1) a minimum number of training instances having a positive response value to a potential event of the plurality of potential events and a minimum number of training instances having a negative response value to the potential event are classified to one side of a decision tree split and (2) the minimum number of training instances having the positive response value to the potential event and the minimum number of training instances having the negative response value to the potential event are classified to the other side of the decision tree split, and (iii) executable instructions comprising a machine-learning system and a prediction model generation system;

the prediction model generation system executed by a physical processing device in communication with the storage device to retrieve the set of data and the splitting criterion and to generate a plurality of prediction models corresponding to the plurality of potential events using the historical information and the splitting criterion, wherein each prediction model of the plurality of prediction models includes a plurality of decision trees and is configured to determine a likelihood of a predicted response to a potential event of the plurality of potential events that corresponds to the prediction model, wherein a decision tree among the plurality of decision trees comprises a set of nodes, one node in the set of nodes corresponds to at least one of variables derived from the historical information and the node is split into multiple nodes according to a value of the at least one variable and using the splitting criterion; and the machine-learning system executed by the physical processing device to predict a response to an event using the plurality of prediction models corresponding to the plurality of potential events.

16. The computer-implemented event response prediction system of claim 15, wherein the machine-learning system is further executable by the physical processing device to:

receive a request from a user device that is communicatively coupled to the computer-implemented event response prediction system via a network;

determine, in response to receiving the request, user information associated with a user of the user device;

determine the likelihoods of predicted responses to each potential event of the plurality of potential events by evaluating the user information against each prediction model of the plurality of prediction models;

select a potential event of the plurality of potential events determined to have a threshold likelihood of yielding a positive predicted response; and transmit the selected potential event to the user device via the network.

17. The computer-implemented event response prediction system of claim 16, wherein the machine-learning system is executable by the physical processing device to select the potential event by:

comparing respective statistical likelihoods, for each prediction model of the plurality of prediction models, that the user will perform the predicted response when experiencing each potential event of the plurality of potential events; and selecting the potential event corresponding to one of the highest statistical likelihoods of the respective statistical likelihoods.

18. The computer-implemented event response prediction system of claim 15, wherein the plurality of potential events corresponds to one of: displaying a variation of requested web content on a user device, a diagnosis of a medical condition, or an event causing a fraudulent response.

19. The method of claim 1, wherein:

splitting the node into the multiple nodes is performed using the splitting criterion when training the decision tree based on a training dataset comprising the training records, each of the training records comprising the variables and a historical response to the content corresponding to the variation of the web content, the historical response comprising the positive response to the content corresponding to the variation of the web content and the negative response to the content corresponding to the variation of the web content.

20. The method of claim 19, wherein the at least one variable is numeric, the decision tree is being used for regression, and a value of the historical response in the training dataset is a sample drawn from an unknown probability distribution.

* * * * *